Patented Nov. 25, 1930

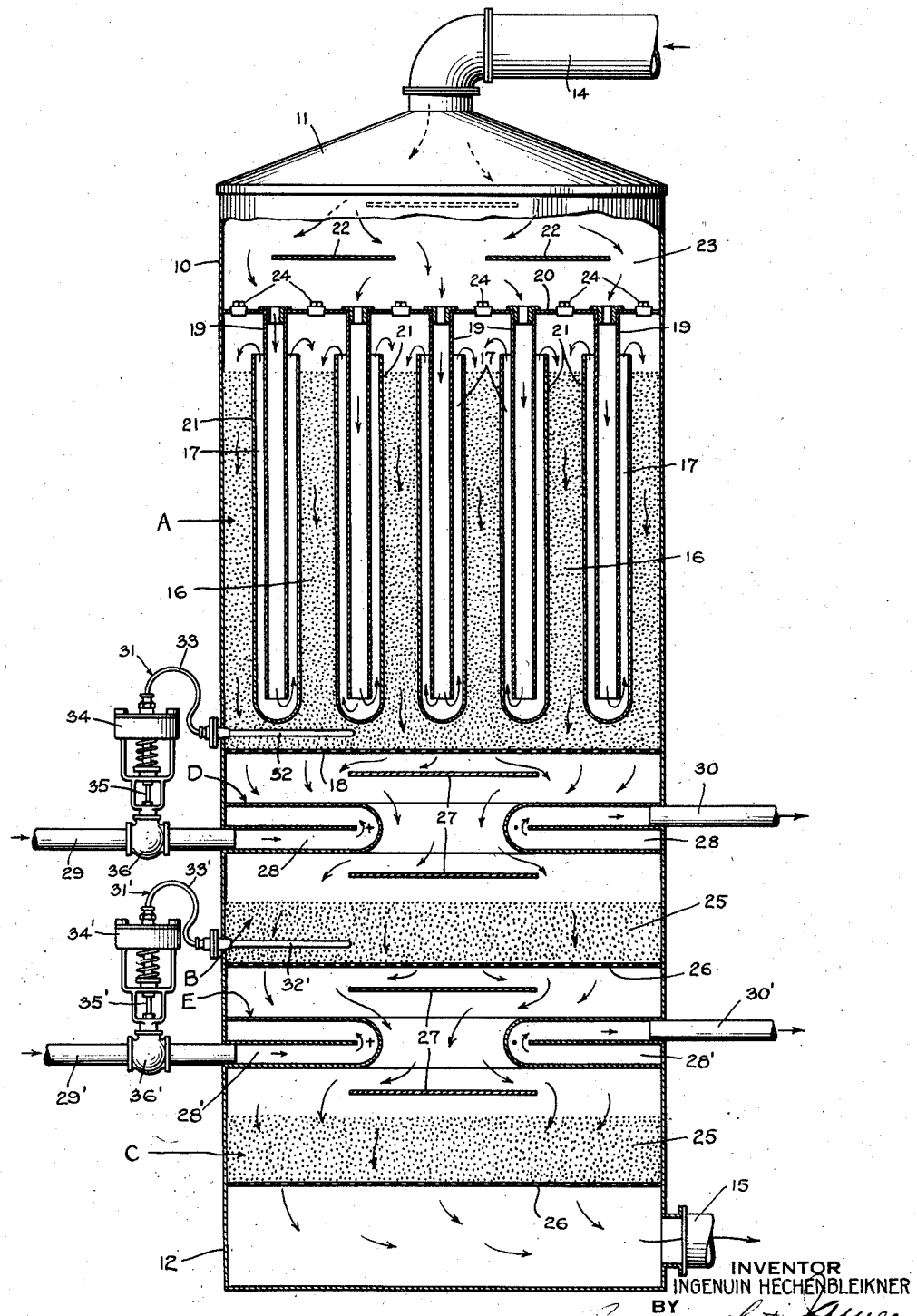

1,782,824

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

CATALYTIC APPARATUS

Application filed May 18, 1928. Serial No. 278,867.

This invention relates to a converter system or catalytic apparatus and relates more particularly to a converter apparatus for carrying out catalytic reactions in the vapor phase and has special reference to the provision of a converter system adapted especially for use in the catalytic oxidation of sulphur dioxide.

A prime desideratum of my present invention centers about the provision of improvements in converter systems of the type disclosed in the patent to A. O. Jaeger No. 1,660,511 of February 28, 1928. In catalytic apparatus of this type, particularly when employed for oxidizing sulphur dioxide in the contact method of producing sulphuric acid, it is requisite to keep the temperature under control not only in the catalyst mass which is subjected to the fresh gases but also in the last catalyst layers which are required to effect the last few percent of reaction. This is due to the fact that the catalytic reaction is relatively sensitive to temperature; and too high a temperature in the last catalyst layers results in a reversible reaction or reversion of the gases and hence in an incomplete oxidation process.

To control the temperature of reaction in the later stages of conversion, it has been suggested to separate the converter system into a converter of relatively large heat generating capacity and one or more additional converters of lower heat generating capacity separated therefrom with heat exchangers interposed therebetween for cooling the gases flowing from the first or main converter where the greatest reaction takes place to the added converter or converters where the last few percent of reaction is effected. This suggested solution of the problem is, however, incomplete and only partially effective and results moreover in an undesired complication of the apparatus. Although the first converter of the system is constructed as an automatic gas cooled apparatus especially designed to maintain uniform reaction temperatures, variations in the temperature of the gas flow leaving the first converter take place, rendering it difficult to uniformly control the temperature of reaction in the added converters of the series or system. The temperature variations in the main or automatic gas cooled converter are largely due to the lack of proportionality between the radiation properties of the converter and the changes in the gas flow through the converter; and for this reason, among others, the added converters are separated spacially from the main converter, this separation minimizing the exposure of the added catalyst layers to the full radiant heat of the highly heated catalyst mass in the main converter. This separation of the converters of the system results, however, in an undesired multiplication of apparatus which incidentally renders the control of the temperature of the gases between the converters more difficult of accomplishement.

To obviate these difficulties while retaining the advantages incident to the use of a converter system of this type, it is the prime desideratum of my present invention to provide, first, a converter in which the reaction temperatures of the added converter or converters, that is the converter (or converters) of lower heat generating capacity, are automatically controlled and preferably by the reaction heat of the main converter, in such a way as to effect a uniform reaction temperature in the added or secondary converters; and, second, a converter system in which the converters of the series are inter-related for effecting a temperature control of one converter governed by the temperature of a converter preceding the same in the series, in such a way as to permit all of the converters of the system or series to be arranged in a single apparatus or structure instead of a plurality of separated structures.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my present invention, and in which:

The figure is a vertical elevational diagrammatic view of the converter system of my present invention.

Referring now more in detail to the drawings, the converter system of my invention comprises a first or main converter A of the automatic gas cooled type and a plurality of secondary or added converters B and C of the so-called layer type all arranged in a single apparatus or structure, with means interposed between the converters of the series for automatically cooling the gases of reaction, said means comprising preferably a gas cooler D arranged between the main converter A and the first layer converter B and a second gas cooler E arranged between the layer converters B and C.

The converter structure comprises a shell 10 having a roof or top 11 and a bottom 12, the said shell 10 being sub-divided into a plurality of chambers including a chamber for the main converter A, chambers for the secondary converters B and C with free spaces interposed between these chambers for the gas cooling means D and E. The top or roof 11 of the converter structure is provided with an inlet 14 for the entering gas mixture; and the bottom 12 of the converter structure is provided with an outlet 15 for the reaction gases, the gas flow through the converter chambers being as indicated by the arrows shown in the figure.

The main converter A is preferably of the automatic gas cooled type and comprises a catalytic mass 16 through which the gases are forced after being preheated by the heat exchanging elements 17, 17. The catalyst mass 16 is supported on a gas permeable bottom 18; and the heat exchanging elements 17, 17 are embedded in the catalyst mass 16, each of said heat exchanging elements comprising an open ended tube 19 passing downwardly through an upper gas impermeable partition 20 into a closed end tube 21, the said open ended tube 19 extending for a substantial distance in the closed end tube 21 below the level of the catalyst mass 16. The closed bottom end tube 21 of each heat exchanging element extends at its top above the level of the catalyst mass 16 as clearly shown in the drawings. Suitable baffle plates 22, 22 may be provided above the converter A arranged in a gas inlet chamber 23. The converter is charged with the catalyst through orifices in the partition 20 closed by plugs 24, 24.

With this recited construction, it will be understood that in entering the main converter the gases, after being thoroughly mixed and distributed by the baffle plates 22, move down through the inner tubes 19 out of direct heat exchanging relation with the catalyst, the gases after striking the bottom of the tubes being then caused to reverse their flow in the heat exchanging elements and to move upwardly through the tubes 21 in direct heat exchanging contact with the catalyst, the gases being then deflected by the upper partition 20 for movement into and through the catalyst mass 16, all as indicated by the arrows in the figure. This main converter A, due to the construction of the heat exchanging elements, possesses substantial cooling properties and effects an automatic cooling of the gases throughout a substantial range of gas velocities.

The converters B and C are substantially similar in construction, each comprising a layer 25 of the catalyst supported on a permeable partition or screen 26, each layer converter receiving the gases from a free space thereabove, each free space being preferably provided with gas deflecting and mixing baffle plates 27, 27.

As heretofore stated, it is essential, particularly in carrying out such exothermic reactions as are met with in the oxidation of sulphur dioxide, to control the reaction temperatures in the added converters B and C within relatively narrow limits so that reversion effects are minimized and complete conversion is produced. Due, however, to a number of factors including perhaps mainly the lack of proportionality between the radiation properties of the converter A and the variations of the gas velocity therethrough, the temperature in the converter A fluctuates with the result that the temperature in the secondary converters B and C is undesirably non-uniform. Moreover, the converters B and C, being arranged contiguous to the main converter A, are exposed to the radiating heat of the highly heated catalyst mass in the converter A, this resulting in producing further uncontrolled variations in the temperature of the secondary converters. As an example of the desired temperature control, it may be stated that with the apparatus thus far disclosed, the temperature of the reaction gases entering the converter B is about 820° to 850° F. whereas it is desired that the temperature of these entering gases be about 775° F. The converter B builds up about 50° F. so that the desirable temperature of reaction in the converter B is about 825° F. whereas the operation temperature may undesirably run to 890° F. Similarly the temperature of the gases entering the converter C should desirably be about 700° F. with a permissible building up of the temperature to 725° F. in the converter C, whereas in operation the entering temperatures are close to 800° F. To effect the maximum conversion, the temperatures in both of these converters should be kept more closely to and within narrow limits of the desired temperatures specified.

The desired and uniform temperature control I have found may be accomplished by the provision of heat exchanging means arranged in the gas spaces between the converters A and B and, if desired, between the converters B and C, and the control of such heat exchanging means automatically by the temperature of the converter preceding in position such heat exchanging means. I have discovered that by means of this arrangement and method of control, the effects of radiation from the converter A may be compensated for and the temperature of the gases in the secondary converters may be made uniform irrespective of the fluctuations in the temperatures of the main converter A.

These results I accomplish by the provision of the gas cooling means D and E arranged in one or both of the free gas spaces between the converters. The gas cooling means D and E are substantially similar in construction and mode of control and a description of the gas cooling means D will therefore suffice for both, the parts of the gas cooling means E being designated by reference characters similar (but primed) to those applied to the parts of the gas cooling means D. The gas cooling means preferably comprises an annular air circulating chamber 28 having an extensive area in the free gas space in which it is placed, the said annular chamber comprising an air cooled jacket for the free space having an air inlet 29 and an air outlet 30. For cooling the gases, the air circulates through this annular chamber in the directions shown by the arrows therein. For governing the temperature of the gases to be cooled, the velocity of flow of the air circulation in the cooling means is controlled by a temperature regulator generally designated as 31, said temperature regulator comprising a regulator bulb 32 inserted into the catalytic mass 16 of the converter A connected by means of a flexible conduit 33 to a head 34 of the regulator, the said head having a bellows construction (not shown) which controls the opening or closing of a valve stem 35 connected to the valve 36. The regulator structure is of a well-known make and does not form part of my present invention. With this apparatus, any change in the temperature in the converter A above or below the point at which the instrument is set is immediately transmitted to the bellows which by expanding and contracting closes or opens the valve 36, thereby regulating the flow of the cooling air or gases, the operation being such that the temperature of the reaction gases entering the secondary converter or converters is maintained uniform within narrow limits.

The use and operation of the converter system of my present invention and the many advantages thereof including those herein above set forth, will now be fully apparent from the above detailed description thereof. It will further be apparent that while I have shown and described my invention in the preferred form, many changes and modifications may be made in the structure disclosed without departing from the spirit of the invention, defined in the following claims.

I claim:

1. A converter system comprising a first converter of large heat generating capacity provided with a catalyst and with automatic cooling means for controlling the converter temperatures, a second converter of lower heat generating capacity connected in cascade to the exit end of the first converter, gas cooling means interposed between two converters, and means controlled by the temperature in said first converter for governing the operation of the said gas cooling means so as to regulate the temperature of the gases leaving the first converter and entering the said second converter.

2. A converter system comprising an automatic gas cooled converter including a catalytic chamber, a catalyst mass therein, a gas permeable bottom supporting said catalyst, a gas impermeable partition above the catalyst mass, upright tubes having closed bottoms, at least a portion of the tubes being imbedded in the catalyst and the open ends being below the gas impermeable upper partition, open ended tubes passing downwardly through the upper partition into the closed end tubes and extending for a substantial distance therein below the level of the catalyst, means for causing reaction gases to pass downwardly through the open ended tubes, upwardly through the closed ended tubes, and then downwardly through the catalyst mass, at least one converter of lower heat generating capacity, gas cooling means interposed between the two converters and means controlled by the temperature of the first converter for governing the operation of the said gas cooling means so as to automatically regulate the temperature of the gases entering the said second converter.

3. A converter system comprising a converter container sub-divided into at least two converter chambers and a free gas space between the converter chambers, a converter in the first chamber provided with a catalyst and with automatic cooling means for controlling the temperatures therein, a converter in said second chamber of lower heat generating capacity than the first converter, gas cooling means arranged in said free gas space between the converters and means controlled by the temperature of the first converter for governing the operation of said gas cooling means so as to automatically regulate the temperature of the gases entering said second converter.

4. A converter system comprising a converter container sub-divided into three converter chambers and free gas spaces between the converter chambers, a converter in the first of said chambers provided with a catalyst and with automatic cooling means for controlling the temperatures therein, converters in said other chambers of lower heat generating capacity than the first converter, gas cooling means arranged in at least one of said free gas spaces and means controlled by the temperature of a converter preceding said gas space for governing the operation of said gas cooling means so as to automatically regulate and maintain substantially constant the temperature of the gases entering the converter succeeding said gas space.

5. A converter system comprising a converter container sub-divided into at least two converter chambers and a free gas space between the converter chambers, a converter in the first chamber provided with a catalyst mass and with automatic gas cooling means for controlling the temperatures therein, a converter in said second chamber of lower heat generating capacity than the first converter and provided with a catalyst layer, and gas cooling means arranged in said free gas space between the converters operable to regulate the temperature of the gases leaving the first converter and entering said second converter.

6. A converter system comprising a container sub-divided into at least two converter chambers and a free gas space between said converter chambers, an automatic gas cooled converter in the first of said chambers including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and to pass in reverse flow through portions of the elements in direct heat exchanging contact with the catalyst and means for deflecting gases issuing from the heat exchanging elements through the said catalyst mass, a converter of the layer type and of lower heat generating capacity in the second of said chambers, means for causing the reaction gases to pass in series first through the automatic gas cooled converter and then through the converter of lower heat generating capacity, gas cooling means arranged in the free space between the two converters and means controlled by the temperature of the first converter for governing the operation of the said gas cooling means so as to regulate the temperature of the gases entering the said second converter.

7. A converter system comprising a container sub-divided into at least two converter chambers and a free gas space between said converter chambers, an automatic gas cooled converter in the first of said chambers including a catalyst mass, heat exchanging elements at least partially embedded in the catalyst mass, means for causing reaction gases to circulate through the heat exchanging elements out of direct heat exchanging relation with the catalyst, means for causing the gases to reverse their flow in the heat exchanging elements and to pass in reverse flow through portions of the elements in direct heat exchanging contact with the catalyst and means for deflecting gases issuing from the heat exchanging elements through the said catalyst mass, a converter of the layer type and of lower heat generating capacity in the second of said chambers, means for causing the reaction gases to pass in series first through the automatic gas cooled converter and then through the converter of lower heat generating capacity, and gas cooling means arranged in the free space between the two converters and operable so as to regulate the temperature of the gases exiting the first converter and entering the said second converter.

8. A converter system comprising a converter container sub-divided into at least two converter chambers and at least one free gas space between said chambers, a converter in the first of the chambers provided with a catalyst and with automatic cooling means for controlling the temperatures therein, a second converter in the second of said chambers of lower heat generating capacity than the first converter, an annular air circulating chamber in said free gas space having air inlet and air outlet means, and means controlled by the temperature of the first converter for governing the flow of air through said inlet means so as to regulate the temperature of the gases entering the said second converter.

9. A converter system comprising a converter container sub-divided into at least two converter chambers and at least one free gas space between said chambers, a converter in the first of the chambers provided with a catalyst and with automatic gas cooling means for controlling the temperatures therein, a second converter in the second of said chambers of lower heat generating capacity than the first converter, an air cooled jacket having an extensive area in said free gas space, an air inlet and an air outlet for said jacket, and means controlled by the temperature of the first converter for governing the flow of air through said inlet so as to regulate the temperature of the gases flowing through said free gas space and entering the said second converter.

10. A converter system comprising a first converter of large heat generating capacity, a second converter of lower heat generating capacity connected in cascade to the exit end of the first converter, gas cooling means interposed between two converters, and means controlled by the temperature in said first converter for governing the operation of the said gas cooling means so as to regulate the temperature of the gases entering the said second converter.

11. A converter system comprising a container sub-divided into two chambers and an intermediate free gas space, an automatic gas cooled converter in the first of said chambers including a catalyst mass, a gas permeable bottom supporting said catalyst, a gas impermeable partition above the catalyst, upright tubes having closed bottoms, at least a portion of the tubes being imbedded in the catalyst and the open ends being below the gas impermeable upper partition, open ended tubes passing downwardly through the upper partition into the closed end tubes and extending for a substantial distance therein below the level of the catalyst, means for causing reaction gases to pass downwardly through the open ended tubes, upwardly through the closed ended tubes, and then downwardly through the catalyst mass, a converter of lower heat generating capacity in the second of said chambers, gas cooling means in said free space between the two converters and means controlled by the temperature of the first converter for governing the operation of the said gas cooling means so as to automatically regulate the temperature of the gases entering the said second converter.

Signed at Charlotte, in the county of Mecklenburg, and State of North Carolina this 16th day of May A. D. 1928.

INGENUIN HECHENBLEIKNER.